US011178306B2

(12) United States Patent
Sato

(10) Patent No.: US 11,178,306 B2
(45) Date of Patent: Nov. 16, 2021

(54) PRINTING APPARATUS, SYSTEM, CONTROL METHOD OF PRINTING APPARATUS, AND STORAGE MEDIUM

(71) Applicant: CANON KABUSHIKI KAISHA, Tokyo (JP)

(72) Inventor: Haruki Sato, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/820,269

(22) Filed: Nov. 21, 2017

(65) Prior Publication Data
US 2018/0152591 A1 May 31, 2018

(30) Foreign Application Priority Data

Nov. 29, 2016 (JP) .............................. JP2016-230831

(51) Int. Cl.
G06F 3/12 (2006.01)
H04N 1/32 (2006.01)
(Continued)

(52) U.S. Cl.
CPC ....... H04N 1/32122 (2013.01); G06F 3/1204 (2013.01); G06F 3/1236 (2013.01); G06F 3/1292 (2013.01); H04N 1/00307 (2013.01); H04N 1/33376 (2013.01); H04W 4/20 (2013.01); H04L 61/2007 (2013.01); H04L 61/2092 (2013.01); H04L 69/08 (2013.01); H04M 1/72412 (2021.01); H04N 2201/0055 (2013.01); H04N 2201/0094 (2013.01); H04N 2201/3208 (2013.01); H04W 4/80 (2018.02); Y02D 30/70 (2020.08)

(58) Field of Classification Search
CPC ........... H04N 1/32122; H04N 1/33376; H04N 1/00307; H04N 2201/3208; H04N 2201/0055; H04N 2201/0094; G06F 3/1292; G06F 3/1236; G06F 3/1204; H04W 4/20; H04W 4/80; H04L 61/2007; H04L 61/2092; H04L 69/08; Y02D 70/10; Y02D 70/14; Y02D 70/144; Y02D 70/142; Y02D 70/166; H04M 1/7253
USPC ........................................................ 358/1.15
See application file for complete search history.

(56) References Cited

U.S. PATENT DOCUMENTS

2007/0030516 A1* 2/2007 Tsuji ..................... G06F 3/1236
358/1.15
2010/0250738 A1* 9/2010 Nagatani ............. H04L 41/0866
709/224
(Continued)

FOREIGN PATENT DOCUMENTS

JP 2016-152538 A 8/2016

OTHER PUBLICATIONS

Bluetooth Specification Version 4.0 [vol. 3] "Advertising and scan response data format", Jun. 30, 2010, pp. 375-378.

Primary Examiner — Huo Long Chen
(74) Attorney, Agent, or Firm — Canon U.S.A., Inc. I.P. Division

(57) ABSTRACT

In a case where an IP address is not available in a printing apparatus, the printing apparatus generates a Bluetooth low energy packet including a specific value as the IP address, and transmits the generated Bluetooth low energy packet to a mobile terminal. Upon receiving of the Bluetooth low energy packet, a mobile terminal displays a message corresponding to the specific value.

6 Claims, 7 Drawing Sheets

(51) Int. Cl.
*H04W 4/20* (2018.01)
*H04N 1/00* (2006.01)
*H04N 1/333* (2006.01)
*H04L 29/12* (2006.01)
*H04M 1/72412* (2021.01)
*H04W 4/80* (2018.01)
*H04L 29/06* (2006.01)

(56) References Cited

U.S. PATENT DOCUMENTS

| | | | |
|---|---|---|---|
| 2010/0253976 A1* | 10/2010 | Kasai | G06F 3/1204 |
| | | | 358/1.15 |
| 2012/0079296 A1* | 3/2012 | Ise | G06F 1/325 |
| | | | 713/310 |
| 2012/0133982 A1* | 5/2012 | Nagai | G06F 3/1267 |
| | | | 358/1.15 |
| 2014/0368874 A1* | 12/2014 | Suzuki | H04N 1/00217 |
| | | | 358/1.15 |
| 2016/0253134 A1* | 9/2016 | Nakai | H04L 61/2007 |
| | | | 358/1.15 |
| 2016/0301737 A1* | 10/2016 | Yamada | G06F 3/1215 |
| 2017/0102903 A1* | 4/2017 | Nagasawa | G06F 3/1222 |
| 2017/0134609 A1* | 5/2017 | Park | G06Q 30/02 |
| 2017/0330062 A1* | 11/2017 | Inoue | H04W 4/80 |

* cited by examiner

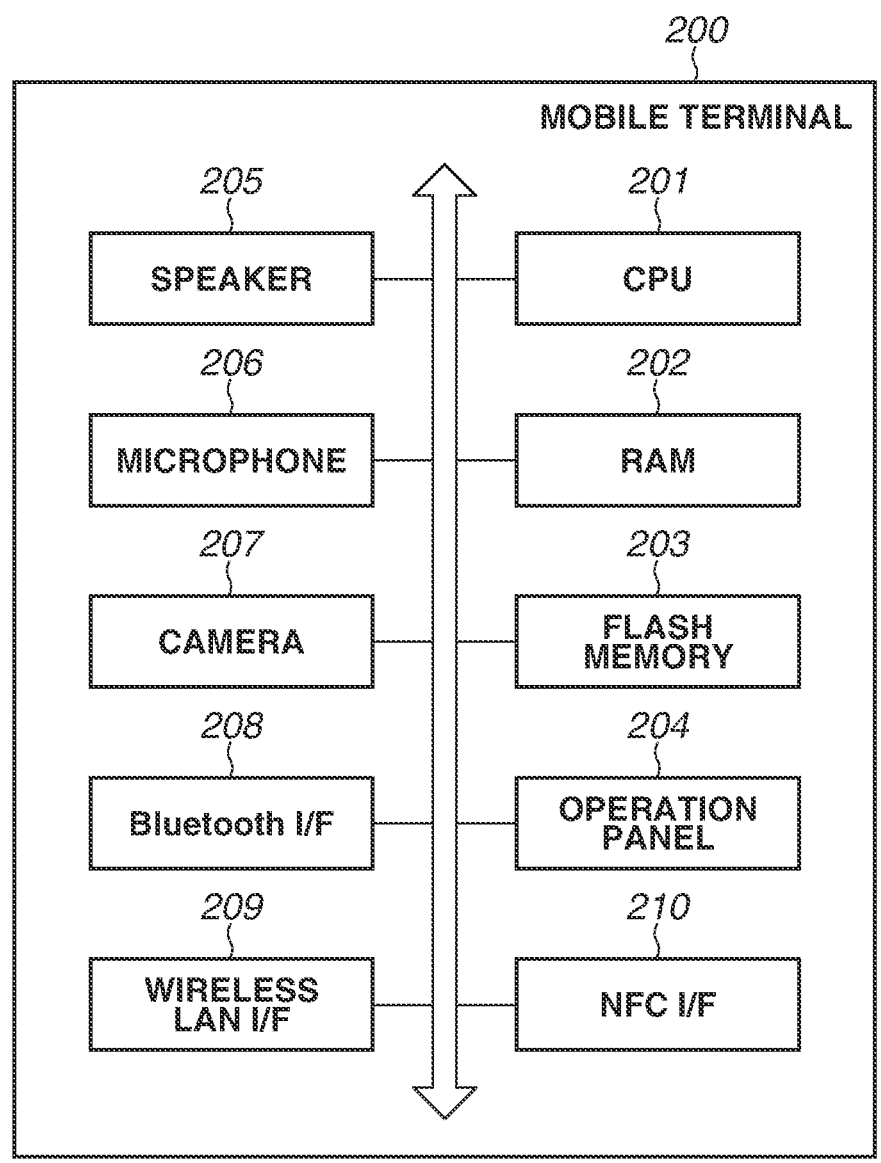

FIG.3A

| HEADER | CONNECTION INFORMATION | SERVER OR RESOURCE PATH | PORT | IP ADDRESS | TX POWER |

FIG.3B

| HEADER | TX POWER | MAC ADDRESS | DEVICE NAME | DEVICE CATEGORY |

400 SETTING SCREEN

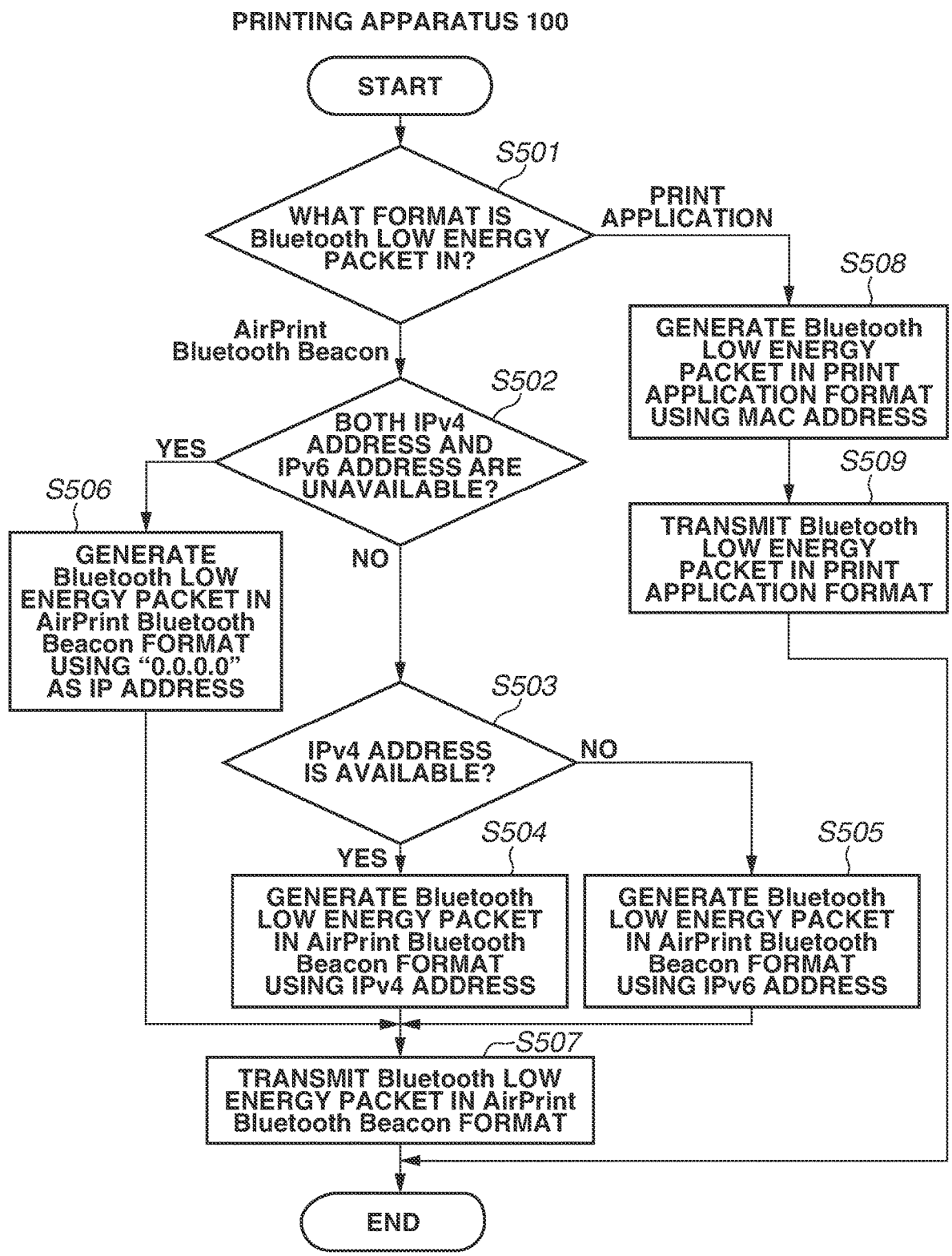

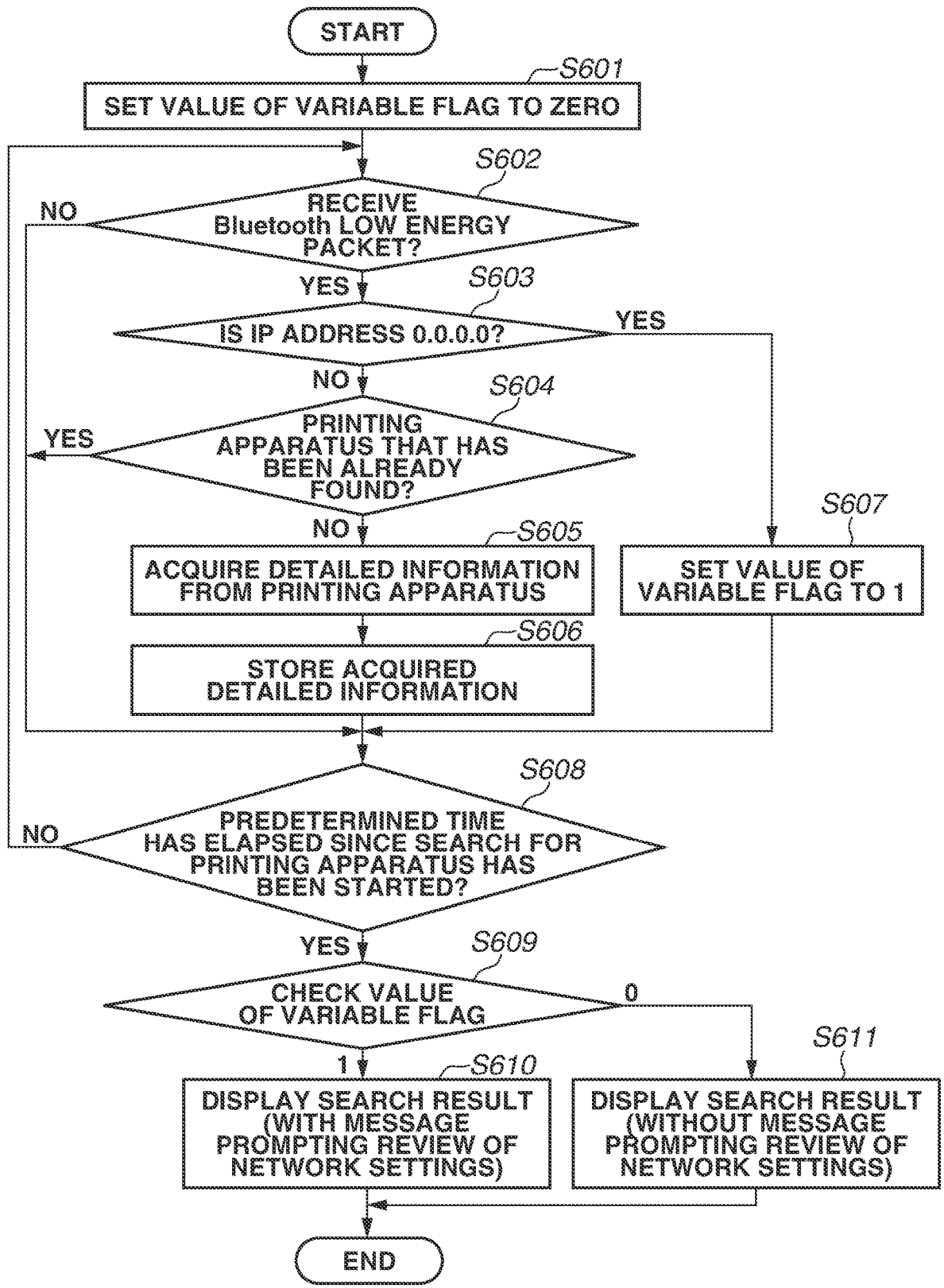

SEARCH RESULT SCREEN 700

SEARCH RESULT SCREEN 710

PRINTING APPARATUS, SYSTEM, CONTROL METHOD OF PRINTING APPARATUS, AND STORAGE MEDIUM

BACKGROUND

Field

The present disclosure relates to a printing apparatus that transmits advertising packets.

Description of the Related Art

In recent years, printing apparatuses, such as multifunction peripherals and printers, having the Bluetooth® low energy function have increased. The printing apparatus having the Bluetooth low energy function transmits data with a Bluetooth low energy advertising packet (hereinafter referred to as a Bluetooth low energy packet) to an external apparatus, such as a mobile terminal. Japanese Patent Application Laid-Open No. 2016-152538 discusses a configuration in which a mobile terminal searches for a printing apparatus using Bluetooth low energy and the mobile terminal transmits print data to a printing apparatus selected by a user from a result of the search.

As a use of the Bluetooth low energy packet, inclusion of an Internet protocol (IP) address of the printing apparatus into a Bluetooth low energy packet has been studied. For example, in AirPrint® Bluetooth Beacon defined by Apple Inc., it is defined that an IP address is stored in a Bluetooth low energy packet. The storing of the IP address of the printing apparatus in the Bluetooth low energy packet enables mobile terminals in its vicinity to easily identify the IP address of the printing apparatus.

The IP address may not be available in the printing apparatus. The case where the IP address is not available indicates a state in which the IP address to be used by the printing apparatus has not been set. If, in this state, the printing apparatus stops sending the Bluetooth low energy packets storing an IP address, such as AirPrint Bluetooth Beacons as described above, the user may not notice the presence of the printing apparatus. If the user does not notice the presence of the print apparatus, the user loses the opportunity to review the network settings of the printing apparatus. As a result, a state in which the print data cannot be transmitted from an external apparatus, e.g., a personal computer (PC), to the printing apparatus continues.

SUMMARY

According to an aspect of the present disclosure, a printing apparatus that executes wireless communication based on Bluetooth low energy includes a printing unit that executes print processing based on print data, a memory device that stores a set of instructions, and at least one processor that executes the set of the instructions to generate, in a case where an IP address is available in the printing apparatus, a Bluetooth low energy advertising packet including the IP address of the printing apparatus, generate, in a case where an IP address is not available in the printing apparatus, a Bluetooth low energy advertising packet including a specific value as the IP address, and periodically transmit the generated BLE advertising packet.

According to another aspect of the present invention, a system includes a printing apparatus that executes wireless communication based on Bluetooth low energy and a mobile terminal. The printing apparatus includes a printing unit that executes print processing based on print data, a memory device that stores a set of instructions, and at least one processor that executes the set of instructions to generate, in a case where an IP address is available in the printing apparatus, a Bluetooth low energy advertising packet including the IP address of the printing apparatus, generate, in a case where an IP address is not available in the printing apparatus, a Bluetooth low energy advertising packet including a specific value as the IP address, and periodically transmit the generated Bluetooth low energy advertising packet. The mobile terminal includes a memory device that stores a set of instructions, and at least one processor that executes the set of instructions to receive a Bluetooth low energy advertising packet transmitted by the printing apparatus, determine whether the received Bluetooth low energy advertising packet includes the specific value, and cause a display unit to display a message corresponding to the specific value in a case where it is determined that the specific value is included.

Further features will become apparent from the following description of exemplary embodiments with reference to the attached drawings.

BRIEF DESCRIPTION OF THE DRAWINGS

FIG. 2 is a diagram illustrating a hardware configuration of a mobile terminal.

FIGS. 3A and 3B are diagrams each illustrating a format of a Bluetooth Low Energy packet.

FIG. 5 is a flowchart illustrating processing executed by the printing apparatus.

FIG. 6 is a flow chart illustrating processing executed by the mobile terminal.

DESCRIPTION OF THE EMBODIMENTS

Hereinafter, a mode for implementing the present disclosure will be described with reference to the drawings. It should be noted that the following exemplary embodiments are not seen to be limiting, and not all combinations of features described in the exemplary embodiments are necessarily indispensable for achieving the exemplary embodiments.

Figure 1:
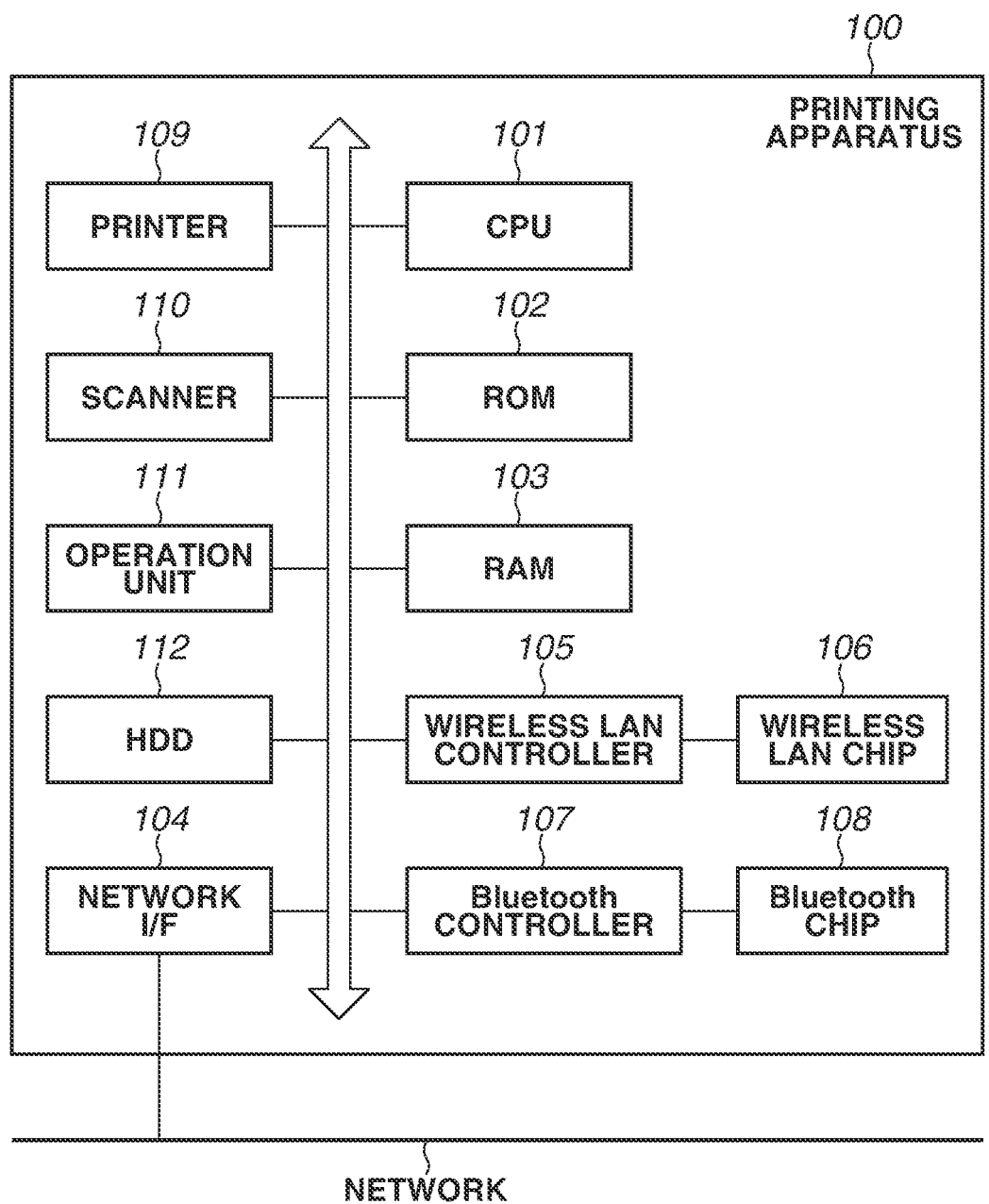
FIG. 1 is a diagram illustrating a hardware configuration of a printing apparatus.

A printing system according to an exemplary embodiment includes a printing apparatus 100 and a mobile terminal 200. First, a hardware configuration of the printing apparatus 100 will be described with reference to FIG. 1. A central processing unit (CPU) 101 reads a control program stored in a read only memory (ROM) 102 and executes various types of processing for controlling the operation of the printing apparatus 100. The ROM 102 stores a control program. The random access memory (RAM) 103 is used as a temporary storage area, such as a main memory and a work area of the CPU 101. A hard disk drive (HDD) 112 is a nonvolatile storage medium that stores various data. While in the printing apparatus 100 of the present exemplary embodiment one CPU 101 executes each process illustrated in a below-described flowchart, other modes can be adopted. For example, a plurality of CPUs can cooperate to execute each process illustrated of the below-described flowchart. In addition, a part of the processing of the below-described flowchart can be executed with a hardware circuit, such as an application-specific integrated circuit (ASIC).

A printer 109 executes print processing on a sheet based on print data received by a wireless local area network (LAN) chip 106 and a network interface (I/F) 104 from an external device. A scanner 110 reads a document placed by a user and generates an image of the document. The image of the document generated by the scanner 110 is printed (copying process) by the printer 109 or stored on a hard disk drive (HDD) 112. An operation unit 111 includes a display including a touch panel function and a keyboard, and displays various operation screens. The user can input instructions and information to the printing apparatus 100 via the operation unit 111.

The wireless LAN chip 106 executes wireless LAN communication, such as IEEE802.11a/b/g/n/ac. A wireless LAN controller 105 controls wireless LAN communication with the wireless LAN chip 106.

A Bluetooth chip 108 is a wireless communication chip for performing wireless communication with Bluetooth. In addition, the Bluetooth chip 108 also includes a Bluetooth low energy function and executes Bluetooth low energy communication. Bluetooth low energy communication includes periodically broadcasting a Bluetooth low energy advertising packet. A Bluetooth controller 107 controls Bluetooth communication with the Bluetooth chip 108.

The network I/F 104 is connected to a network with a LAN cable. The network I/F 104 communicates with an external device, e.g., personal computer (PC), on the network, receives print data from the external device, and transmits the image of the document generated by the scanner 110 to the external device.

Next, the hardware configuration of the mobile terminal 200 will be described with reference to FIG. 2. The mobile terminal 200 is assumed to be a communication device, such as a smartphone or a tablet PC. A CPU 201 reads a control program stored in a flash memory 203 and executes various types of processing for controlling the operation of the mobile terminal 200. A RAM 202 is used as a temporary storage area, such as a main memory and a work area of the CPU 201. The flash memory 203 is a nonvolatile storage medium for storing control programs for the mobile terminal 200 and various data, such as photographs and electronic documents.

An operation panel 204 includes a touch panel function that detects a touch operation performed by the user, and displays various screens. The user can input a desired operation instruction to the mobile terminal 200 with a touch operation on the operation panel 204. The mobile terminal 200 includes a hardware key (not illustrated), and the user can also input an operation instruction to the mobile terminal 200 using this hardware key.

A speaker 205 and a microphone 206 are used when the user is making a telephone call. A camera 207 executes imaging in response to a user's imaging instruction. The photograph imaged by the camera 207 is stored in a predetermined area of the flash memory 203.

A Bluetooth I/F 208 executes wireless communication based on Bluetooth. The Bluetooth I/F 208 includes a Bluetooth low energy function and receives Bluetooth low energy advertising packets transmitted from an external device, such as the printing apparatus 100. A wireless LAN I/F 209 includes a wireless LAN function and executes wireless LAN communication, such as IEEE802.11a/b/g/n/ac. A near field communication (NFC) I/F 210 executes proximity wireless communication based on NFC.

The printing apparatus 100 transmits advertising packets in a plurality of formats. In the following description, the Bluetooth low energy advertising packet is referred to as a Bluetooth low energy packet. The plurality of formats includes AirPrint Bluetooth Beacon and print application. Each format will be described with FIGS. 3A and 3B.

FIG. 3A illustrates the format of AirPrint Bluetooth Beacon. The AirPrint Bluetooth Beacon is a format defined by Apple Inc., and is defined to store data about connection information, path, port number, Internet protocol (IP) address, transmission radio field strength, in the corresponding field. The Bluetooth low energy packet in AirPrint Bluetooth Beacon format is used by a PC or a mobile terminal compatible with AirPrint. A PC and mobile terminal perform device search using the Bluetooth low energy packet in AirPrint Bluetooth Beacon format. Unlike the print application format to be described in FIG. 3B, the AirPrint Bluetooth Beacon format is characterized by including an IP address of the printing apparatus 100. Using the IP address included in the Bluetooth low energy packet in AirPrint Bluetooth Beacon format, a wireless communication terminal establishes communication with the printing apparatus 100 based on a communication protocol different from Bluetooth low energy. For example, the wireless communication terminal, e.g., a PC or a mobile terminal, can perform Wi-Fi® communication with the printing apparatus 100 using the IP address included in the Bluetooth low energy packet.

FIG. 3B illustrates the print application format. The print application is a format defined by a manufacturer of the printing apparatus 100, and is defined to store the transmission field strength, media access control (MAC) address, device name, and device category in the corresponding field. The manufacturer of the printing apparatus 100 provides a print application for the mobile terminal. The user installs the print application on the mobile terminal and uses the printing function of the printing apparatus 100. The advertising packet in the print application format is used by the mobile terminal on which the print application provided by the manufacturer of the printing apparatus 100 has been installed. A wireless communication terminal, such as a PC or a mobile terminal, identifies a device supporting the print application based on the advertising packet in the print application format.

Unlike the AirPrint Bluetooth Beacon format described in FIG. 3A, the print application format is characterized by including the MAC address of the printing apparatus 100. The wireless communication terminal establishes communication with the printing apparatus 100 based on a communication protocol different from Bluetooth low energy by using the IP address and the MAC address included in the advertising packet of the print application format. For example, the wireless communication terminal can perform Wi-Fi® communication with the printing apparatus 100 using the IP address and the MAC address included in the advertising packet.

Figure 4:
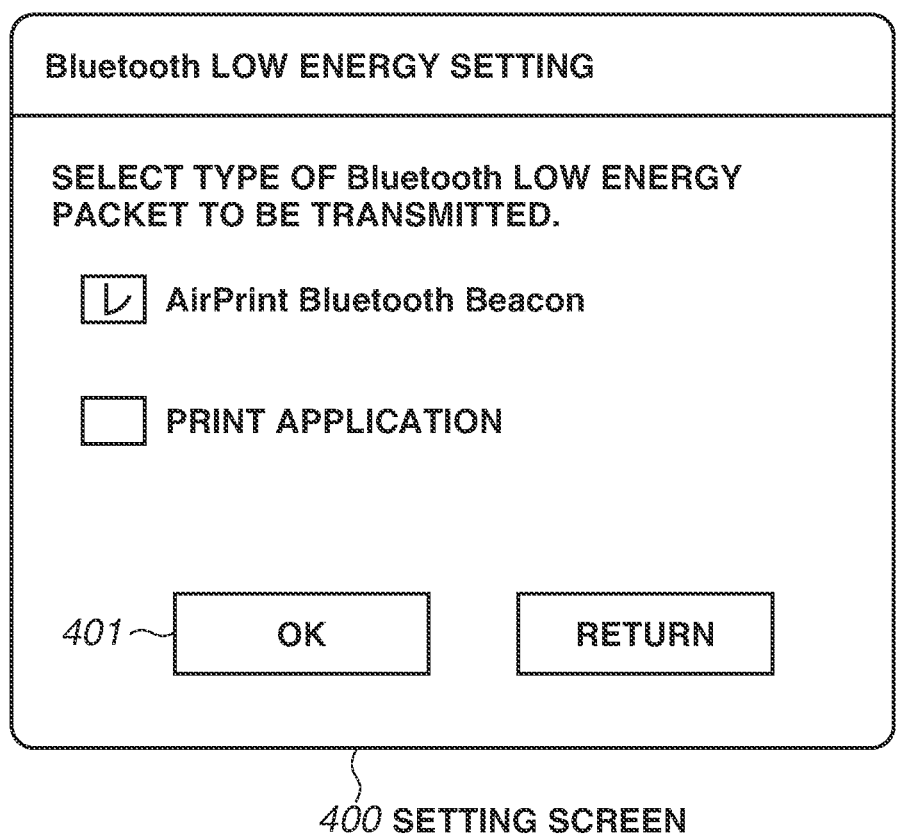
FIG. 4 is a diagram illustrating a setting screen displayed by the printing apparatus.

A setting screen 400 in FIG. 4 is a screen displayed by the operation unit 111 of the printing apparatus 100. The printing apparatus 100 transmits either the Bluetooth low energy packet in the AirPrint Bluetooth Beacon format or the Bluetooth low energy packet in the print application format. Using the setting screen 400, the user sets the format of the Bluetooth low energy packet to be transmitted to the printing apparatus 100.

When the user wishes to transmit the Bluetooth low energy packet in the AirPrint Bluetooth Beacon format to the printing apparatus 100, the user selects "AirPrint Bluetooth Beacon" on the setting screen 400. When the user wishes to transmit the Bluetooth low energy packet in the print application format to the printing apparatus 100, the user selects "print application" on the setting screen 400. When the user presses the OK button 401, the printing apparatus 100 stores the result of the setting performed on the setting screen 400 as the device setting in the HDD 112.

Next, the processing of transmitting the Bluetooth low energy packet by the printing apparatus 100 will be described with reference to the flowchart illustrated in FIG. 5. The steps illustrated in the flowchart of FIG. 5 are processed by the CPU 101 loading the control program stored in the ROM 102 in the RAM 103 and then executing thereof. Processing illustrated in the flowchart of FIG. 5 is executed when the printing apparatus 100 is activated or when the user presses the OK button 401 on the setting screen 400.

First, in step S501, the CPU 101 identifies the format of a Bluetooth low energy packet to be transmitted. The processing is realized by the CPU 101 referring to a result of setting, performed on the setting screen 400, stored in the HDD 112. If the format of the Bluetooth low energy packet set as the device setting is AirPrint Bluetooth Beacon ("AirPrint Bluetooth Beacon" in step S501), the processing proceeds to step S502. If the format of the Bluetooth low energy packet set as the device setting is the print application ("print application" in step S501), the processing proceeds to step S508.

In step S502, the CPU 101 determines whether both the IPv4 address and the IPv6 address are unavailable. In a case where the IP address is unavailable, the IP address has not been set in the printing apparatus 100. If the CPU 101 determines that both the IPv4 address and the IPv6 address are unavailable (YES in step S502), the processing proceeds to step S506. If the CPU 101 determines that both the IPv4 address and the IPv6 address are not unavailable (NO in step S502), the processing proceeds to step S503. In a case where both the IPv4 address and the IPv6 address are not unavailable, both the IPv4 address and the IPv6 address have been set in the printing apparatus 100 or either the IPv4 address or the IPv6 address has been set in the printing apparatus 100.

In step S503, the CPU 101 determines whether the IPv4 address is available. In a case where the IPv4 address is available, the IPv4 address has been set in the printing apparatus 100. If the CPU 101 determines that the IPv4 address is available (YES in step S504), the processing proceeds to step S504. If the CPU 101 determines that the IPv4 address is not available (NO in step S504), the processing proceeds to step S505.

In step S504, the CPU 101 generates a Bluetooth low energy packet in the AirPrint Bluetooth Beacon format using the IPv4 address of the printing apparatus 100. The CPU 101 stores the IPv4 address of the printing apparatus 100 in an IP address field of the AirPrint Bluetooth Beacon format, described in FIG. 3A, and generates a Bluetooth low energy packet.

The processing in step S504 can be executed when both the IPv4 address and the IPv6 address are available in the printing apparatus 100. In such a case, the CPU 101 generates a Bluetooth low energy packet in the AirPrint Bluetooth Beacon format using the IPv4 address instead of the IPv6 address. More specifically, when both the IPv4 address and the IPv6 address are available, a Bluetooth low energy advertising packet including the IPv4 address from among the available IPv4 address and the available IPv6 address is generated. The IPv4 address is selected while the IPv6 address is not selected because network infrastructure environments supporting the IPv6 address are fewer in number than those supporting the IPv4 address. In a case where both the IPv4 address and the IPv6 address are available in the printing apparatus 100, inclusion of the IPv4 address instead of the IPv6 address in the Bluetooth low energy packet increases the possibility that the mobile terminal can properly process the received Bluetooth low energy packet.

In step S505, the CPU 101 generates a Bluetooth low energy packet in the AirPrint Bluetooth Beacon format using the IPv6 address of the printing apparatus 100. The CPU 101 stores the IPv6 address of the printing apparatus 100 in the IP address field in the AirPrint Bluetooth Beacon format described in FIG. 3A and generates a Bluetooth low energy packet. There are a plurality of types of IPv6 addresses, such as stateful address, stateless address, and link local address. In the printing apparatus 100, the plurality of types of IPv6 addresses is available in some cases. In a case where the plurality of types of IPv6 addresses is available in the printing apparatus 100, the CPU 101 selects an IPv6 address based on a predefined priority order. Then, the CPU 101 generates a Bluetooth low energy packet in the AirPrint Bluetooth Beacon format using the selected IPv6 address. The priority order is, for example, the stateful address as the first priority, the stateless address as the second priority, and the link local address as the third priority.

The processing in step S506 is executed in a case where it is determined in step S502 that both the IPv4 address and the IPv6 address are unavailable. In step S506, the CPU 101 generates a Bluetooth low energy packet in the AirPrint Bluetooth Beacon format using "0.0.0.0" as the IP address. The CPU 101 stores "0.0.0.0" being a value indicating that the IP address is unavailable in the IP address field of the AirPrint Bluetooth Beacon format described in FIG. 3A, and generates a Bluetooth low energy packet. A case where the processing in step S506 is to be executed means that the IP address to be used by the printing apparatus 100 has not been set. It is necessary to store an IP address in the Bluetooth low energy packet in the AirPrint Bluetooth Beacon format. In the present exemplary embodiment, the printing apparatus 100 generates a Bluetooth low energy packet in the AirPrint Bluetooth Beacon format using the value "0.0.0.0" as the IP address. Assume that the user confirms that the printing apparatus 100 has sent a Bluetooth low energy packet in the AirPrint Bluetooth Beacon format whose IP address is "0.0.0.0". In such a case, the user can grasp that the IP address of the printing apparatus 100 is not set and it is necessary to review the network setting of the printing apparatus 100.

In step S507, the CPU 101 transmits the Bluetooth low energy packet in AirPrint Bluetooth Beacon format generated in any one of steps S504, S505, or S506. The CPU 101 instructs the Bluetooth controller 107 to transmit the Bluetooth low energy packet in the AirPrint Bluetooth Beacon format. Then, the Bluetooth controller 107 controls the Bluetooth chip 108 to transmit the Bluetooth low energy packet in the AirPrint Bluetooth Beacon format. The Bluetooth chip 108 starts transmitting the Bluetooth low energy packet in the AirPrint Bluetooth Beacon format in a predetermined cycle, e.g., with intervals of 100 msec.

The processing in step S508 is executed in a case where the CPU 101 identifies the format of the Bluetooth low energy packet, which has been set as the device setting, as the print application in step S501. In step S508, the CPU 101 generates a Bluetooth low energy packet in the print application format using the MAC address of the printing apparatus 100. The CPU 101 stores the MAC address of the printing apparatus 100 in the MAC address field in the print application format described in FIG. 3B and generates a Bluetooth low energy packet.

Next, in step S509, the CPU 101 transmits the Bluetooth low energy packet in the print application format generated in step S508. The CPU 101 instructs the Bluetooth controller 107 to transmit the Bluetooth low energy packet in the print application format. The Bluetooth controller 107 then controls the Bluetooth chip 108 to transmit the Bluetooth low energy packet in the print application format. The Bluetooth chip 108 starts transmitting the Bluetooth low energy packet in the print application format generated in step S508 in a predetermined cycle, e.g., in intervals of 30 msec.

As described above, in a case where the IP address in the printing apparatus 100 is not available (not set), the printing apparatus 100 continues the transmission of the Bluetooth low energy packet in the AirPrint Bluetooth Beacon format without stopping. The printing apparatus 100 generates a Bluetooth low energy packet in the AirPrint Bluetooth Beacon format using a specific value of "0.0.0.0" as the IP address. Here, the value "0.0.0.0" is an example, and other values can be used.

The mobile terminal 200 searches for a printing apparatus using the Bluetooth low energy packet in the AirPrint Bluetooth Beacon format transmitted from an external apparatus, such as the printing apparatus 100. The search for the printing apparatus is executed in order for the user to select the transmission destination of print data in the mobile terminal 200. Processing executed in a case where the mobile terminal 200 searches for the printing apparatus will be described with reference to the flowchart in FIG. 6. The steps illustrated in the flowchart of FIG. 6 are processed by the CPU 201 loading the control program stored in the flash memory 203 in the RAM 202 and then executing thereof. The processing illustrated in the flow chart of FIG. 6 is executed in a case where the user presses a search start button (not illustrated) on the mobile terminal 200.

In step S601, the CPU 201 sets the value of a variable Flag to zero. As described below, the method for displaying a search result changes based on the value of the variable Flag.

Next, in step S602, the CPU 201 determines whether a Bluetooth low energy packet in the AirPrint Bluetooth Beacon format has been received. If the CPU 201 determines that the Bluetooth I/F 208 has received the Bluetooth low energy packet in the AirPrint Bluetooth Beacon format (YES in step S602), the processing proceeds to step S603. If the CPU 201 determines that the Bluetooth I/F 208 has not received the Bluetooth low energy packet in the AirPrint Bluetooth Beacon format (NO in step S602), the processing proceeds to step S608.

In step S603, the CPU 201 determines whether the IP address stored in the received Bluetooth low energy packet is "0.0.0.0". If the CPU 201 determines that the IP address stored in the received Bluetooth low energy packet is "0.0.0.0" (YES in step S603), the processing proceeds to step S607. If the CPU 201 determines that the IP address stored in the received Bluetooth low energy packet is not "0.0.0.0" (NO in step S603), the processing proceeds to step S604.

In step S604, the CPU 201 determines whether the printing apparatus, the transmission source of the received Bluetooth low energy packet, is the printing apparatus that has been already found. As described below in step S606, the IP address of the printing apparatus 100 that was previously found is stored in a search result list. In step S604, the CPU 201 checks whether the IP address stored in the received Bluetooth low energy packet is stored in the search result list. If the IP address stored in the received Bluetooth low energy packet is stored in the search result list (YES in step S604), the CPU 201 determines that the printing apparatus being the transmission source of the received Bluetooth low energy packet is the printing apparatus that was previously found, and the processing proceeds to step S608. If the IP address stored in the received Bluetooth low energy packet is not stored in the search result list (NO in step S604), the CPU 201 determines that the printing apparatus being the transmission source of the received Bluetooth low energy packet is not the printing apparatus that was previously found, and the processing proceeds to step S605.

In step S605, the CPU 201 acquires detailed information from the printing apparatus being the transmission source of the received Bluetooth low energy packet. The CPU 201 controls the wireless LAN I/F 209 to transmit acquisition request for the detailed information, with the IP address stored in the received Bluetooth low energy packet as a destination. The wireless LAN I/F 209 transmits the acquisition request for the detailed information in accordance with an instruction made by the CPU 201. In the present exemplary embodiment, the detailed information indicates a model name and capability information, e.g., whether color printing is possible, but other types of information can be acquired as the detailed information. The process of step S605 is realized through wireless LAN communication.

Next, in step S606, the CPU 201 stores the detailed information acquired from the printing apparatus in the search result list. The search result list is stored in a temporary storage area provided by the RAM 202, and includes information about the IP address stored in the received Bluetooth low energy packet and the detailed information (model name and capability information) acquired from the printing apparatus.

The process of step S607 is a process executed in a case where it is determined in step S603 that the IP address stored in the received Bluetooth low energy packet is "0.0.0.0". In step S607, the CPU 201 sets the value of the variable Flag to 1.

In step S608, the CPU 201 determines whether a predetermined time, e.g., 15 seconds, has elapsed since the start of the search for the printing apparatus. If the CPU 201 determines that the predetermined time has not elapsed since the start of the search for the printing apparatus (NO in step S608), the processing returns to step S602. If the CPU 201 determines that a predetermined time has elapsed since the start of the search for the printing apparatus (YES in step S608), the processing proceeds to step S609.

In step S609, the CPU 201 checks the value of the variable Flag. If the value of the variable Flag is one ("1" in step S609), the processing proceeds to step S610. If the value of the variable Flag is zero ("0" in step S609), the processing proceeds to step S611.

Figure 7A:
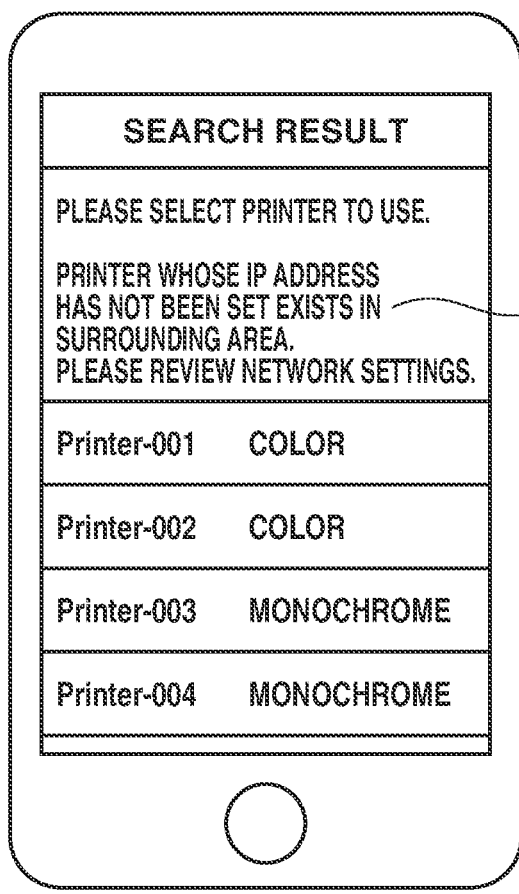
FIGS. 7A and 7B are diagrams each illustrating a search result screen displayed by the mobile terminal.

In step S610, the CPU 201 displays a result of the search for the printing apparatus. An example of the search result to be displayed in step S610 is illustrated in a search result screen 700 in FIG. 7A. The search result screen 700 is displayed by the operation panel 204 under the control of the CPU 201. On the search result screen 700, the model names of and capability information about printing apparatuses existing in proximity to the mobile terminal 200 are displayed based on the information stored in the search result list. The user selects the transmission destination of print data from among the printing apparatuses displayed on the search result screen 700. The processing in step S610 is executed when the value of the variable Flag is one. The value of the variable Flag being one means that a printing apparatus storing "0.0.0.0" as the IP address in the Bluetooth low energy packet, that is, a printing apparatus whose IP address has not been set exists in proximity to the mobile terminal 200. To that end, the CPU 201 displays a message 701 on the search result screen 700 and notifies the user that the printing apparatus whose IP address has not been set exists in proximity to the mobile terminal 200. With the message 701, the user can grasp that the printing apparatus whose IP address has not been set exists nearby, and can review the network setting of the printing apparatus as necessary.

Figure 7B:
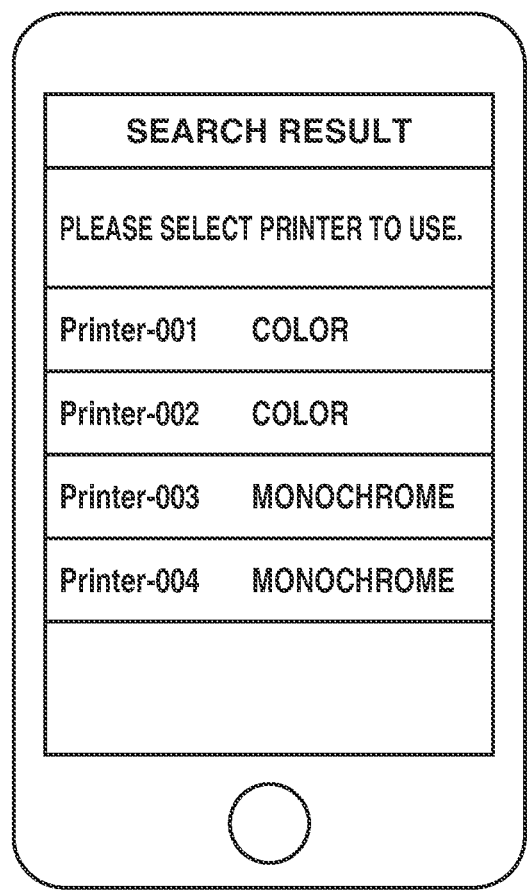

In step S611, the CPU 201 displays the result of the search for the printing apparatus. An example of the search result displayed in step S611 is illustrated in a search result screen 710 in FIG. 7B. The search result screen 710 is displayed by the operation panel 204 under the control of the CPU 201. On the search result screen 710, as with the search result screen 700 in FIG. 7A, model names of and capability information about the printing apparatus existing in proximity to the mobile terminal 200 are displayed based on the information stored in the search result list. By contrast, the message 701 on the search result screen 700 is not displayed on the search result screen 710. This is because the value of the variable Flag is zero and a printing apparatus whose IP address has not been set is not present in proximity to the mobile terminal 200.

As described above, the mobile terminal 200 displays the message 701 in a case where the mobile terminal 200 has discovered the printing apparatus storing a specific value (for example, "0.0.0.0") as the IP address in the Bluetooth low energy packet in the AirPrint Bluetooth Beacon format. As a result, the user can grasp that the printing apparatus whose IP address has not been set exists nearby, and can review the network setting of the printing apparatus as necessary.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-230831, filed Nov. 29, 2016, which is hereby incorporated by reference herein in its entirety.

What is claimed is:

1. A system comprising:
   a printing apparatus that executes wireless communication based on Bluetooth low energy; and
   a mobile terminal,
   wherein the printing apparatus comprises:
   a printer that executes print processing based on print data;
   a memory device that stores a set of instructions; and
   at least one processor that executes the set of instructions to:
   determine whether an Internet Protocol (IP) address is available in the printing apparatus;
   generate a Bluetooth low energy advertising packet including an IP address field in which the IP address of the printing apparatus is set in a case where it is determined that the IP address is available in the printing apparatus, and generate a Bluetooth low energy advertising packet including the IP address field in which a predetermined value is set in a case where it is determined that the IP address is not available in the printing apparatus; and
   periodically transmit the generated Bluetooth low energy advertising packet,
   wherein the mobile terminal comprises:
   a memory device that stores a set of instructions; and
   at least one processor that executes the set of instructions to:
   start search processing for searching for a printing apparatus, wherein the search processing is processing of finding a printing apparatus that transmits a Bluetooth low energy advertising packet by performing Bluetooth Low Energy packet scanning;
   determine whether the IP address field of the received Bluetooth low energy advertising packet corresponding to the found printing apparatus includes the predetermined value;
   send an inquiry about a capability to a printing apparatus and receive a response to the inquiry, using the IP address which is not the predetermined value included in the received Bluetooth low energy advertising packet; and
   upon condition that it is determined that the predetermined value is included and a printing apparatus capable of performing communication is found by using the IP address which is not the predetermined value included in the Bluetooth low energy advertising packet corresponding to the found printing apparatus, cause a display unit to display a selection screen at least including an item for selecting the printing apparatus capable of performing communication as an output printing apparatus and a warning message indicating that a printing apparatus whose IP address is not set exists near the mobile terminal,
   wherein the warning message and the item are displayed in different formats on the selection screen,
   wherein the item for selecting the printing apparatus includes at least information that indicates printer capability information based on capability information obtained as the response to the inquiry, and wherein, upon condition that the IP address field of the received Bluetooth low energy advertising packet includes the predetermined value, the inquiry about the capability to the printing apparatus using the predetermined value is not performed.

2. The system according to claim 1, wherein the warning message further includes a message that prompts a user to review a network setting of the printing apparatus.

3. The system according to claim 1, wherein the predetermined value is 0.0.0.0.

4. The system according to claim 1, wherein a case that the IP address is available in the printing apparatus is a state in which the IP address to be used by the printing apparatus has been set, and a case that the IP address is not available in the printing apparatus is a state in which the IP address to be used by the printing apparatus has not been set.

5. The system according to claim 1, wherein, in a case where both an IPv4 address and an IPv6 address are available in the printing apparatus, a Bluetooth low energy advertising packet including the IPv4 address but not including IPv6 address is generated.

6. The system according to claim 1, wherein, even in a case where a plurality of different printing apparatuses transmits the Bluetooth low energy advertising packet that includes the predetermined value as the IP address and where the plurality of printing apparatuses is found by performing the search processing, the warning message that is a single message is displayed on the selection screen.

* * * * *